United States Patent
Massara

[11] Patent Number: 5,826,937
[45] Date of Patent: Oct. 27, 1998

[54] PNEUMATIC ENERGY ABSORBING SEAT ASSEMBLY

[75] Inventor: Andrew J. Massara, Vargön, Sweden

[73] Assignee: Lear Corporation, Southfield, Mich.

[21] Appl. No.: 853,436

[22] Filed: May 9, 1997

Related U.S. Application Data

[63] Continuation-in-part of Ser. No. 787,677, Jan. 23, 1997, abandoned.

[51] Int. Cl.$^6$ .................................................. A47C 4/54
[52] U.S. Cl. .................................. 297/284.6; 297/284.1
[58] Field of Search .............................. 297/284.4, 284.6, 297/391, 408, DIG. 3, 452.41, 284.1, 452.29, 452.3, 452.38, 452.56, 216.12, 216.13

[56] References Cited

U.S. PATENT DOCUMENTS

| | | |
|---|---|---|
| 2,843,195 | 7/1958 | Barvaeus . |
| 2,973,029 | 2/1961 | Schlosstein . |
| 3,326,601 | 6/1967 | Vanderbilt et al. . |
| 4,350,388 | 9/1982 | Weiner . |
| 4,865,388 | 9/1989 | Nemoto . |
| 4,966,413 | 10/1990 | Palarski . |
| 5,076,643 | 12/1991 | Colasanti et al. . |
| 5,082,326 | 1/1992 | Sekido et al. . |
| 5,137,329 | 8/1992 | Neale . |
| 5,562,324 | 10/1996 | Massara et al. . |

FOREIGN PATENT DOCUMENTS

| | | |
|---|---|---|
| 8500736 | 2/1985 | WIPO . |
| WO 94/07393 | 4/1994 | WIPO . |

*Primary Examiner*—Milton Nelson, Jr.
*Attorney, Agent, or Firm*—Brooks & Kushman PC

[57] ABSTRACT

A vehicle seat assembly includes a seat back shell having upper and lower ends, and a bracket mounted to the seat back shell having a slot formed therethrough. A substantially S-shaped flexible plate is positioned adjacent the seat back shell and slidable within the slot. A cushion is positioned adjacent the S-shaped flexible plate. At least one inflatable lumbar bladder is positioned between the shell and the flexible plate between the bracket and the lower end. At least one inflatable thoracic adjustment bladder is positioned between the shell and the flexible plate between the bracket and the upper end. The contour of the seat assembly is adjustable by inflating and deflating the lumbar and thoracic bladders. A head restraint system includes a damper mechanism positioned between the upper end of the shell and the head restraint for energy management in a high energy impact. Also provided is a cushion and trim assembly adapted for direct attachment to the flexible plate having a plurality of attachment apertures formed therein. The cushion and trim assembly includes trim flaps which are attachable to the attachment apertures, and the flexible plate is partially slidable within the bracket.

8 Claims, 3 Drawing Sheets

PNEUMATIC ENERGY ABSORBING SEAT ASSEMBLY

CROSS-REFERENCE TO RELATED APPLICATION

This invention is a continuation-in-part of U.S. Ser. No. 08/787,677, filed Jan. 23, 1997 entitled "Pneumatic Energy Absorbing Seat Assembly", now abandoned, and which is assigned to the assignee of the present application and which is hereby incorporated by reference in its entirety.

TECHNICAL FIELD

The present invention relates to a pneumatic energy absorbing seat assembly with a pneumatically adjustable seat back.

BACKGROUND ART

In a high energy impact, large impact forces may be delivered to the occupant by the seat in a rearward impact. As the occupant is forced against the seat, a large energy pulse may be experienced.

A particular safety problem may arise if the occupant has not properly adjusted the head restraint system or if the seat back does not closely and firmly support the entire spine during the impact. Undesirable spacing between the occupant and the seat back and head restraint may allow the occupant to be propelled against the seat.

No known seat assembly exists which provides close and firm support of the entire spine for the occupant, provides an adjustable seat back contour, and also manages energy in the head restraint in a high energy impact. Accordingly, it is desirable to provide such a vehicle seat assembly with an adjustable contour to closely fit against the spine of the occupant while including an adjustable head restraint system with energy management capability.

Typical seat assemblies also comprise a large number of components, and the trim cover is typically pulled over the top of the seat like a sock for covering the seat back. This assembly process is cumbersome and time-consuming and results in expensive assembly. Accordingly, it is desirable to provide a vehicle seat assembly with simplified trim cover attachment, and with reduced trim content and reduced part count.

DISCLOSURE OF THE INVENTION

As a result of Lear Corporation's continuing efforts to improve vehicle safety, the present invention overcomes the above-referenced shortcomings of prior art seat assemblies by providing a pneumatic seat assembly in which the seat back and head restraint are pneumatically adjustable to closely fit the contour of the occupant's spine, and the head restraint is provided with a damper mechanism(s) for managing energy in a high energy impact.

More specifically, the present invention provides a vehicle seat assembly, comprising a seat back shell having upper and lower ends, and a bracket mounted to the seat back shell having a slot formed in the bracket. A flexible plate is positioned adjacent the seat back shell and is slidable within the slot. The plate includes first and second surfaces. A cushion is positioned against the first surface. At least one inflatable lumbar bladder is positioned between the shell and the flexible plate between the bracket and the lower end. At least one inflatable thoracic adjustment bladder is positioned between the shell and the flexible plate between the bracket and the upper end. In this configuration, the contour of the seat assembly is adjustable by inflating and deflating the lumbar and thoracic bladders.

In the preferred embodiment, a head restraint member is secured to the second end of the flexible plate, whereby the head restraint member is adjustable forward and rearward in vehicle by inflating and deflating the at least one thoracic adjustment bladder. Additionally, a damper mechanism is positioned between the head restraint member and the upper end of the shell for damping movement of the head restraint member in a high energy impact.

In another embodiment, the present invention provides a flexible plate, trim cover and cushion assembly which is directly loadable onto to a seat back shell in a manner to reduce trim cover content, and to simplify the assembly process. Because this assembly is attached to the seat back shell in a single step operation, the sock-type installation is eliminated, which reduces assembly time and assembly cost.

More specifically, this alternative embodiment comprises a seat back shell having upper and lower ends with a bracket mounted to the seat back shell, wherein the bracket has a bracket slot formed therethrough. A flexible plate is positioned adjacent the seat back shell and is slidable within the bracket slot. A trim cover is connected to the flexible plate and includes a cushion disposed therein.

Accordingly, an object of the present invention is to provide a seat back assembly with an adjustable contour for providing close and firm support of the entire spine in a high energy impact.

A further object of the present invention is to provide a vehicle seat assembly including a head restraint mechanism incorporating a damper for managing energy in a high energy impact.

Another object of the present invention is to provide a vehicle seat assembly with reduced trim cover content and simplified assembly procedure.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
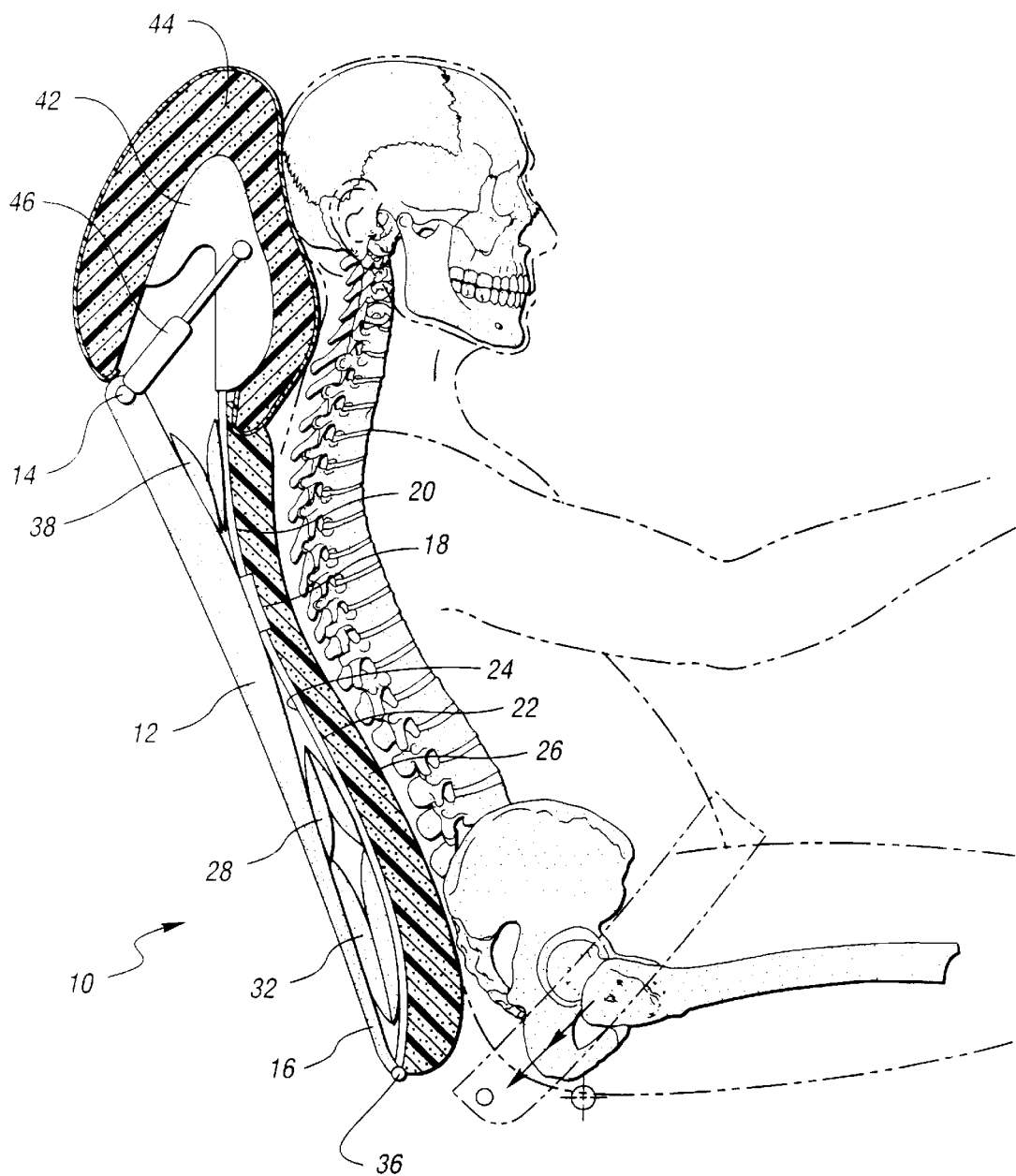
FIG. 1 shows a schematically arranged vertical cross-section of a vehicle seat assembly in accordance with the present invention.

FIG. 1 shows a schematically arranged vertical cross-sectional view of a vehicle seat assembly 10 in accordance with the present invention. The vehicle seat assembly 10 includes a seat back shell 12 having upper and lower ends 14,16, respectively. A bracket 18 is mounted to the seat back shell 12 and includes a slot formed therethrough. The bracket 18 is preferably a plastic member which spans the width of the shell 12.

A flexible plate 20 is positioned adjacent the seat back shell 12 and is slidable within the slot formed in the bracket 18. The plate 20 includes first and second surfaces 22,24, respectively. A cushion 26 is positioned against the first surface 22 of the plate 20.

A plurality of inflatable lumbar bladders 28, 32 are positioned between the shell 12 and the flexible plate 20, between the bracket 18 and the lower end 16 of the shell 12.

The flexible plate 20 is hinged to the lower end 16 of the shell 12 by the hinge 36. Accordingly, when the inflatable lumbar bladders 28, 32 are inflated or deflated, the flexible plate 20 is flexed and pivots at the hinge 36, and the plate 20 slides within the bracket 18 such that the contour of the plate 20 is adjusted.

Similarly, an inflatable thoracic adjustment bladder 38 is positioned between the shell 12 and the flexible plate 20 between the bracket 18 and the upper end 14 of the shell 12. A head restraint member 42 is secured to the upper end of the flexible plate 20, whereby the head restraint member 42 is adjustable forward and rearward in vehicle by inflating and deflating the thoracic adjustment bladder 38. The head restraint member 42 is preferably a blow-molded hollow plastic material. An energy absorbing foam 44 is secured to the head restraint member 42.

A damper mechanism 46 is secured between the upper end 14 of the shell 12 and the head restraint member 42 for energy management in a high energy impact. The damper 46 will allow gradual movement of the head restraint member 42 with respect to the shell 12 as the thoracic adjustment bladder 38 is inflated or deflated for adjusting the forward/rearward position of the head restraint member 42 in the vehicle, and the damper 46 will be configured to dissipate head restraint energy in a rearward impact to cushion the load transfer between the occupant and the head restraint member 42.

Accordingly, in this configuration, the contour of the seat back may be adjusted by inflating or deflating the lumbar bladders 28, 32 and the thoracic bladder 38, to alter the curvature of the flexible plate 20 so that the seat back and head restraint fit closely adjacent the spine and neck of the vehicle occupant.

The various bladders 28, 32, 38 may be filled with any inert gas, or foam or liquid for additional energy management characteristics.

Additionally, the energy management aspects of the system may be tailored to the occupant weight. For example, using a pneumatic seat lift mechanism, the weight of the occupant may be sensed and this information may be used for adjusting the damper 46 and bladders 28, 32, 38.

The combination of the energy absorbing foam 44, the cushion 26, the damper 46, and bladders 28, 32, 38 will cooperate to manage energy of the occupant in a rearward impact and to prevent the occurrence of undesirable spinal compression or large energy pulses.

Figure 2:
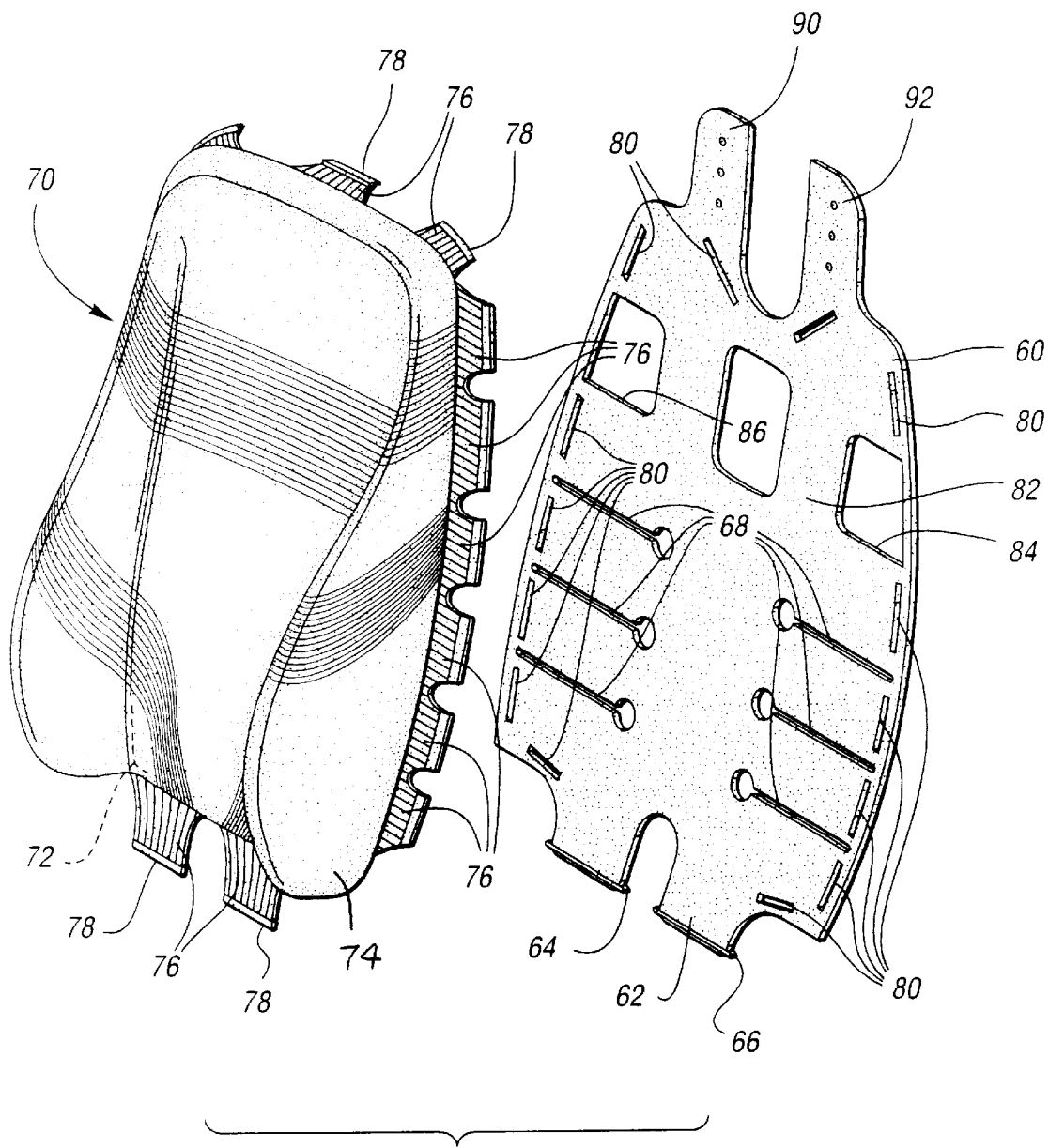
FIG. 2 shows an exploded perspective view of a flexible plate, cushion and trim cover assembly in accordance with the present invention.
Figure 3:
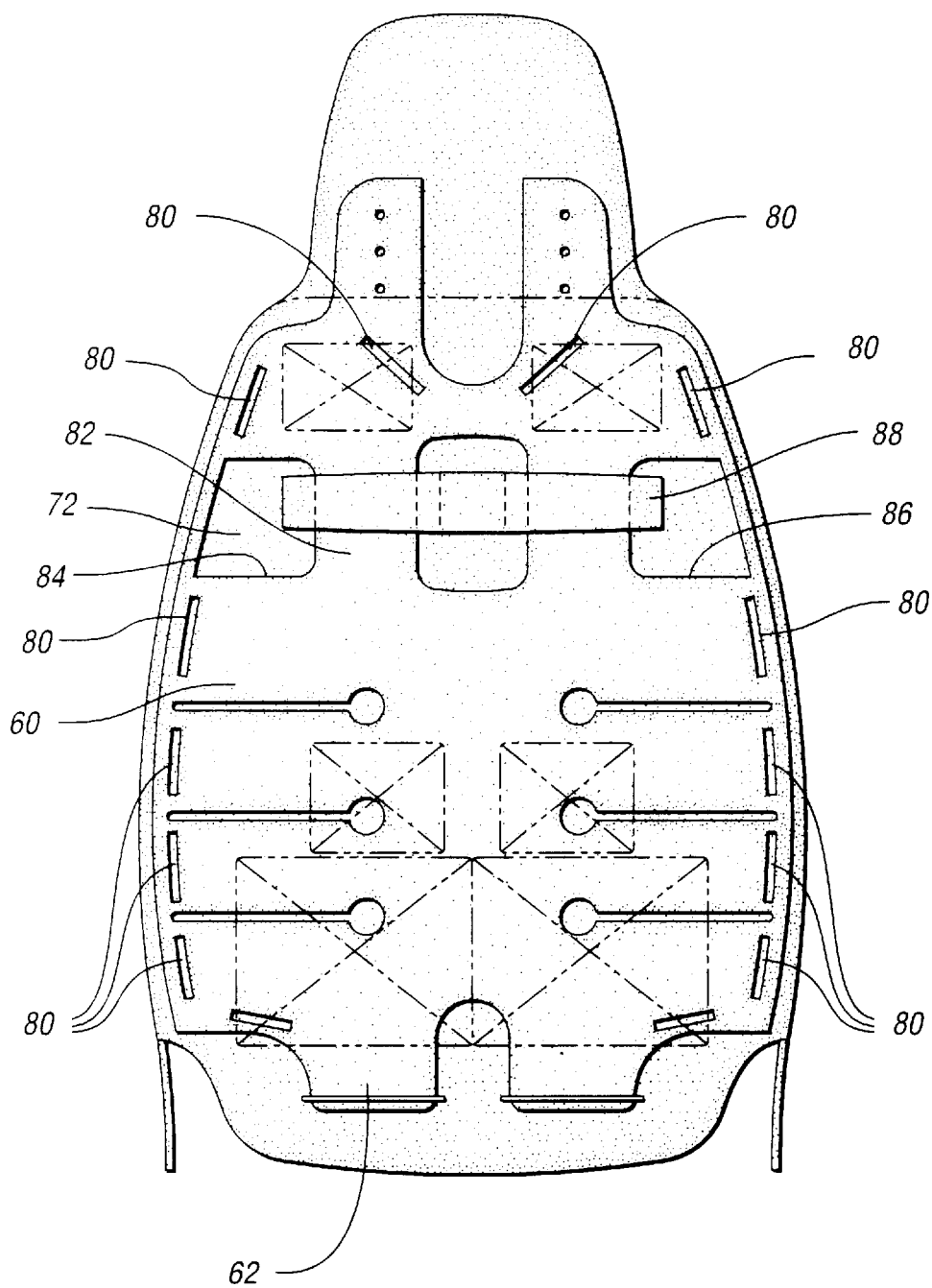
FIG. 3 shows a rear view of the flexible plate, cushion, and trim cover assembly shown in FIG. 2.

Turning to FIG. 2, an alternative embodiment of the present invention is shown. In this embodiment, the flexible plate 60 (corresponding with the flexible plate 20 shown in FIG. 1) is adapted for mounting to a seat back shell, such as the shell 12 shown in FIG. 1. The flexible plate 60 comprises a lower end portion 62 with snap features 64,66 for snap-in attachment to the lower end of a shell.

In order to facilitate bending of the flexible plate 60 as the seat back assembly is pneumatically flexed, as described previously, laterally-extending bend slots 68 are provided in the plate 60. In this configuration, the bend slots 68 readily facilitate bending of the plate 60.

The flexible plate 60 is further adapted to support the cushion and trim assembly 70. The cushion and trim assembly 70 comprises a cushion 72 which is covered by a trim cover 74. The trim cover 74 includes a plurality of trim flaps 76 having attachment features 78 disposed at distal ends thereof to facilitate attachment within the attachment apertures 80 formed about the periphery of the flexible plate 60. For attachment of the cushion and trim assembly 70 to the flexible plate 60, the trim flaps 76 are stretched around the back of the flexible plate 60, and the attachment features 78 connect the distal ends of the respective trim flaps 76 within the corresponding attachment aperture 80. The attachment features 78 could be J-clips, Hog rings, or any other commonly known attachment feature in the seating art.

The flexible plate 60 further comprises a central portion 82 positioned between opposing apertures 84,86 formed in the flexible plate 60 for cooperation with the bracket 88, which corresponds to the bracket 18 shown in FIG. 1. In this configuration, as the flexible plate 60 is pneumatically flexed as described above, the central portion 82 of the flexible plate 60 is free to slide within the bracket 88 to facilitate such flexing motion. The flexible plate 60 also includes a pair of upstanding head rest support portions 90,92.

In an assembly operation, the cushion and trim assembly 70 would be laid face down, the bracket 88 would be installed over the central portion 82 of the flexible plate 60, and finally, the flexible plate 60 and bracket 88 would be laid over the top of the cushion and trim assembly 70. The trim flaps 76 would then be pulled around to the rear of the flexible plate 60, and the attachment features 78 on the distal ends of the trim flaps 76 would be used to secure the trim flaps 76 within the apertures 80 of the flexible plate 60. This entire assembly would then be loaded into a seat back shell by attaching the bracket 88 to the seat back shell, and attaching the snap features 64,66 at the lower end portion 62 of the flexible plate 60 to the lower end of the shell, such as at the attachment point 36 shown in FIG. 1. This load-type assembly operation eliminates the sock-type assembly operation of the prior art, and greatly reduces trim content, because only the cushion 72 must be covered with trim, and the shell need not be trimmed.

The seat back shell, such as shell 12 shown in FIG. 1, may be formed substantially in the shape of a clam shell so that it wraps around the peripheral edges of the cushion and trim assembly 70 once the cushion and trim assembly 70 and flexible plate 60 have been installed and attached within the shell. The shell may comprise a grained plastic material, or any other material, thus eliminating approximately half of the trim cover content. This assembly may also substantially reduce assembly time because the sock-type installation is very time-consuming and labor-intensive.

This assembly may also reduce seat assembly part count by eliminating the typical seat back frame and other structural components.

While the best mode for carrying out the invention has been described in detail, those familiar with the art to which this invention relates will recognize various alternative designs and embodiments for practicing the invention within the scope of the appended claims.

What is claimed is:

1. A vehicle seat back assembly adapted for attachment to a seat back shell, comprising:

a bracket adapted for attachment to the seat back shell, said bracket having a bracket slot formed therethrough;

a flexible plate adapted for positioning adjacent the seat back shell and having a portion slidably received within said bracket slot;

at least one thoracic bladder and at least one lumbar bladder positioned against the flexible plate, wherein said bracket slot is positioned between the thoracic bladder and lumbar bladder;

a trim cover attached to the flexible plate; and a cushion disposed within the trim cover.

2. The vehicle seat assembly of claim 1, wherein said flexible plate comprises a plurality of laterally extending bend slots formed therein to facilitate bending of the flexible plate.

3. The vehicle seat assembly of claim 1, wherein said flexible plate comprises a central portion positioned between opposing apertures formed in the plate for cooperation with the bracket, such that said central portion is slidable within said bracket slot.

4. The vehicle seat assembly of claim 1, further comprising a plurality of attachment apertures formed in said flexible plate, and wherein said trim cover comprises a plurality of trim flaps attachable to said plurality of attachment apertures for securing the cushion and trim cover to the flexible plate.

5. The vehicle seat assembly of claim 1, wherein said flexible plate comprises a lower end having a snap feature adapted for attachment to the lower end of said seat back shell.

6. The vehicle seat assembly of claim 1, wherein said flexible plate comprises a pair of upstanding head rest support portions.

7. A vehicle seat assembly, comprising:

a seat back shell operative as a seat backframe and having upper and lower ends a bracket mounted to the seat back shell and having a bracket slot formed therethrough;

a flexible plate positioned adjacent the seat back shell and having a portion slidably received within said bracket slot;

said flexible plate having a plurality of attachment apertures formed therein; and a cushion and trim assembly directly attached to the flexible plate, said cushion and trim assembly comprising a plurality of trim flaps attachable to said plurality of attachment apertures for securing the cushion and trim assembly to the flexible plate.

8. A vehicle seat assembly, comprising:

a seat back shell operative as a seat backframe and having upper and lower ends;

a bracket mounted to the seat back shell and having a bracket slot formed therethrough;

a flexible plate positioned adjacent the seat back shell and having a portion slidably received within said bracket slot, said flexible plate comprising a pair of upstanding headrest support portions; and a cushion and trim assembly directly attached to the flexible plate.

\* \* \* \* \*